US012631811B2

(12) United States Patent
Koo et al.

(10) Patent No.: US 12,631,811 B2
(45) Date of Patent: May 19, 2026

(54) POLARIZING PLATE AND OPTICAL DISPLAY APPARATUS

(71) Applicant: SAMSUNG SDI CO., LTD., Yongin-si (KR)

(72) Inventors: Jun Mo Koo, Suwon-si (KR); Seong Hoon Lee, Suwon-si (KR); Dae Seob Shim, Suwon-si (KR); Seon Gyeong Jeong, Suwon-si (KR); Boem Deok Lee, Suwon-si (KR); Hyoung Tae Lim, Suwon-si (KR); Seung Mi Shin, Suwon-si (KR); Kyung Min Cho, Suwon-si (KR); Ki Beom Kim, Suwon-si (KR); Sang Hum Lee, Suwon-si (KR); Jung Hun You, Suwon-si (KR); Dong Ho Wee, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 290 days.

(21) Appl. No.: 18/587,148

(22) Filed: Feb. 26, 2024

(65) Prior Publication Data

US 2024/0302582 A1 Sep. 12, 2024

(30) Foreign Application Priority Data

Mar. 2, 2023 (KR) ........................ 10-2023-0027991

(51) Int. Cl.
*G02B 5/30* (2006.01)
*G02F 1/1335* (2006.01)

(52) U.S. Cl.
CPC ......... *G02B 5/3033* (2013.01); *G02B 5/3083* (2013.01); *G02F 1/133528* (2013.01)

(58) Field of Classification Search
CPC ...... G02B 5/3033; G02B 5/3083; G02B 5/30; G02B 5/3016; G02B 5/3025; G02F 1/133528; G02F 1/13363; G02F 1/133637
(Continued)

(56) References Cited

U.S. PATENT DOCUMENTS 9,442,233 B2 9/2016 Murakami et al.
2016/0025913 A1* 1/2016 Oh ........................ G02B 5/3083
359/487.02

(Continued)

FOREIGN PATENT DOCUMENTS

CN 113227853 A 8/2021
CN 114252948 A 3/2022
(Continued)

OTHER PUBLICATIONS

Taiwanese Office Action dated Feb. 26, 2025, corresponding to Taiwanese Patent Application No. 113107138 (10 pages).

*Primary Examiner* — Arnel C Lavarias
(74) *Attorney, Agent, or Firm* — Ricky Lam

(57) ABSTRACT

A polarizing plate and an optical display apparatus are disclosed. A polarizing plate includes a polarizer and a stack of retardation layers on a surface of the polarizer, and the stack of retardation layers includes a second retardation layer and a first retardation layer stacked on the polarizer in sequence from the surface of the polarizer, the second retardation layer being a non-liquid crystal layer, and the stack of retardation layers has an out-of-plane retardation of −40 nm or more to less than 0 nm at a wavelength of 550 nm and satisfies Relation 1.

20 Claims, 2 Drawing Sheets

(58) Field of Classification Search
USPC ............ 359/489.07, 483.01, 487.01, 487.02,
359/489.01, 489.05; 362/19; 353/20;
349/96.117, 118, 119, 120, 122, 96, 117
See application file for complete search history.

(56) References Cited

U.S. PATENT DOCUMENTS

| | | |
|---|---|---|
| 2018/0052271 A1 | 2/2018 | Wang et al. |
| 2022/0075108 A1* | 3/2022 | Koo ........................... C08L 1/12 |
| 2022/0099873 A1 | 3/2022 | Jo et al. |
| 2024/0241301 A1* | 7/2024 | You .......................... G02B 1/04 |

FOREIGN PATENT DOCUMENTS

| | | | |
|---|---|---|---|
| JP | 2009-053257 A | 3/2009 | |
| KR | 10-2013-0103595 A | 9/2013 | |
| TW | 201829169 A | 8/2018 | |
| WO | WO-2020138878 A1 * | 7/2020 | ............... G02B 5/30 |

* cited by examiner 300
100
400
220
210

210
220
100
300

POLARIZING PLATE AND OPTICAL DISPLAY APPARATUS

CROSS-REFERENCE TO RELATED APPLICATION

The present application claims priority to and the benefit of Korean Patent Application No. 10-2023-0027991, filed on Mar. 2, 2023 in the Korean Intellectual Property Office, the entire disclosure of which is incorporated herein by reference.

BACKGROUND

1. Field

Aspects of embodiments of the present invention relate to a polarizing plate and an optical display apparatus.

2. Description of the Related Art

A light emitting diode display including organic light emitting diodes or a liquid crystal display is provided with a polarizing plate in order to improve optical characteristics. In the polarizing plate, a polarizer includes a polyvinyl alcohol based film dyed with dichroic pigments and stretched. The polarizing plate is required to have durability under high temperature and high humidity conditions.

The polarizer may include a retardation layer to provide an optical compensation function. Although the retardation layer may be a single layer, the retardation layer can have better optical properties when present in a multilayer structure.

The background technique of the present invention is disclosed in Korean Patent Laid-open Publication No. 10-2013-0103595 and the like.

SUMMARY

According to an aspect of embodiments of the present invention, a polarizing plate that exhibits good durability even after being left under high temperature and high humidity conditions or at high temperature for a long period of time is provided.

According to another aspect of embodiments of the present invention, a polarizing plate that has good frontal contrast ratio, suppresses light leakage at a lateral side through reduction in lateral luminance in a black mode, and reduces color shift at the lateral side is provided.

According to an aspect of one or more embodiments of the present invention, a polarizing plate is provided.

According to one or more embodiments, a polarizing plate includes: a polarizer; and a stack of retardation layers on a surface of the polarizer, wherein the stack of retardation layers includes a second retardation layer and a first retardation layer stacked on the polarizer in sequence from the surface of the polarizer, the second retardation layer being a non-liquid crystal layer, and wherein the stack of retardation layers has an out-of-plane retardation of −40 nm or more to less than 0 nm at a wavelength of 550 nm and satisfies Relation 1:

$$1.1 \leq Rth(450)/Rth(550) \leq 1.5, \quad \text{Relation 1}$$

where Rth(450) and Rth(550) are out-of-plane retardations (unit: nm) of the stack of retardation layers at wavelengths of 450 nm and 550 nm, respectively.

According to another aspect of one or more embodiments of the present invention, an optical display apparatus is provided.

In one or more embodiments, an optical display apparatus includes the polarizing plate according to an embodiment of the present invention.

Embodiments of the present invention provide a polarizing plate that has good durability even after being left under high temperature and high humidity conditions or at high temperature for a long period of time.

Further, embodiments of the present invention provide a polarizing plate that has good frontal contrast ratio, suppresses light leakage at a lateral side through reduction in lateral luminance in a black mode, and reduces color shift at the lateral side.

DETAILED DESCRIPTION

Figure 1:
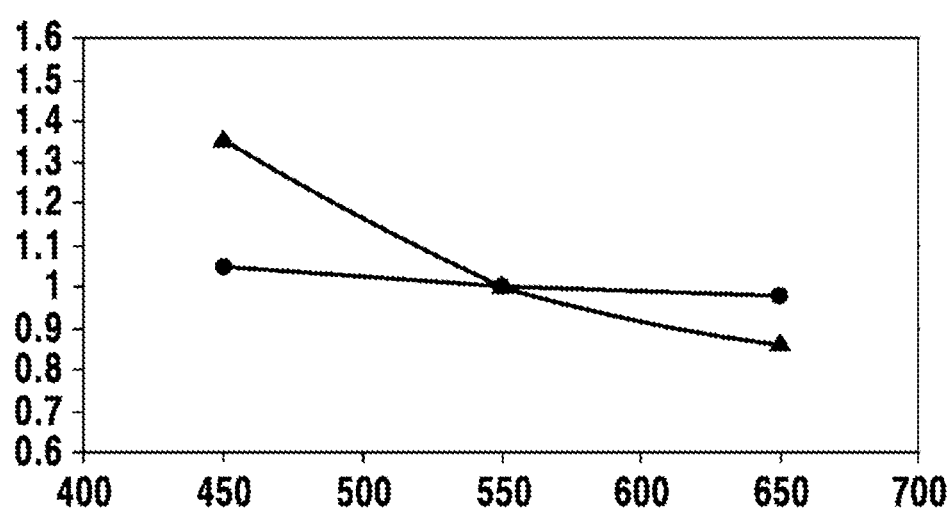
FIG. 1 is a graph depicting wavelength dispersion of a stack of retardation layers, in which the X-axis indicates wavelengths (unit: nm), the Y-axis indicates wavelength dispersion values of out-of-plane retardation or in-plane retardation, ▲ marks the wavelength dispersion values of the out-of-plane retardation, and ● marks the wavelength dispersion values of the in-plane retardation.

Herein, some example embodiments of the present invention will be described in further detail with reference to the accompanying drawings such that the present invention can be implemented by those skilled in the art. However, it is to be understood that the present invention may be realized in various ways and is not limited to the following embodiments. Although lengths, thicknesses, or widths of various components may be exaggerated in the drawings for clarity of description of the present invention, the present invention is not limited thereto. Like components are denoted by like reference numerals throughout the specification.

The terminology used herein is for the purpose of describing example embodiments and is not intended to limit the present invention. As used herein, the singular forms "a," "an," and "the" are intended to include the plural forms as well, unless the context clearly indicates otherwise.

Herein, spatially relative terms, such as "upper" and "lower," are defined with reference to the accompanying drawings. Thus, it is to be understood that "upper surface" can be used interchangeably with "lower surface" and vice versa. When an element is referred to as being formed "directly on," "immediately on," or "to directly adjoin" another element, there are no intervening element(s) therebetween.

As used herein, "in-plane retardation (Re)," "out-of-plane retardation (Rth)," and "degree of biaxiality (NZ)" are represented by Equations A, B, and C, respectively:

$$Re = (nx - ny) \times d; \qquad \text{(A)}$$

$$Rth = \left((nx + ny)/2nz\right) \times d; \qquad \text{(B)}$$

$$\text{and } NZ = (nx - nz)/(nx - ny), \qquad \text{(C)}$$

where nx, ny, and nz are the indexes of refraction of an optical element in the slow-axis direction, the fast-axis direction, and the thickness direction of the optical element at a measurement wavelength, respectively, and d is the thickness (unit: nm) of the optical element.

In Equations A to C, "optical element" may be a first retardation layer, a second retardation layer, a protective layer, or a stack of retardation layers. In Equations A to C, the measurement wavelength may be 450 nm, 550 nm, or 650 nm.

Herein, "(meth)acryl" refers to acryl and/or methacryl.

Herein, "water vapor transmission rate" means a value measured, for example, at 23° C. and at 99% RH (relative humidity) to 100% RH. The water vapor transmission rate may be measured using a measurement device (PERMATRAN-W, MODEL 700). A sample for measurement of the water vapor transmission rate may be prepared by cutting a retardation layer into a specimen having a size of 10 cm×10 cm (length×width), followed by placing the specimen in the measurement device. Herein, "water vapor transmission rate" of a protective layer may also be measured by the same method as above.

Herein, "glass transition temperature" of a second retardation layer may be measured by differential scanning calorimetry (DSC).

Herein, wavelength dispersion values of in-plane retardation at wavelengths of 450 nm, 550 nm, and 650 nm are Re(450)/Re(550), Re(550)/Re(550), and Re(650)/Re(550), respectively.

Herein, wavelength dispersion values of out-of-plane retardation at wavelengths of 450 nm, 550 nm, and 650 nm are Rth(450)/Rth(550), Rth(550)/Rth(550), Rth(650)/Rth (550), respectively.

As used herein to represent a specific numerical range, "X to Y" means a value greater than or equal to X and less than or equal to Y (X≤ and ≤Y).

Generally, a typical polarizing plate includes a polarizer including a polyvinyl alcohol based film dyed with dichroic pigments and stretched. The polarizer can suffer from elution of dichroic pigments when left under high temperature and high humidity conditions for a long period of time. The eluted dichroic pigments can contaminate an optical display panel, thereby causing deterioration in reliability of an optical display apparatus and clarity of screen quality thereof.

By contrast, a polarizing plate according to one or more embodiments of the present invention has good durability even after being left under high temperature and high humidity conditions for a long period of time. In an embodiment, the polarizing plate exhibits very low variation in light transmittance and polarization degree and has a trace amount of dichroic pigments or no dichroic pigments eluted therefrom after being left at 60° C. and 95% RH for 250 hours or more. For example, the dichroic pigments may be iodine and the like. In this regard, the polarizing plate includes a non-liquid crystal layer as a second retardation layer described below. Here, "elution of dichroic pigments" can be confirmed by evaluating the degree of iodine discoloration through observation of an edge of a polarizing plate after the polarizing plate is left in a chamber under high temperature and high humidity conditions (60° C. and 95% RH) for 250 hours.

The polarizing plate according to one or more embodiments provides an effect of increasing a frontal contrast ratio. In addition, the polarizing plate according to one or more embodiments reduces light leakage and color shift at a lateral side while securing good clarity on a black screen. Further, the polarizing plate according to one or more embodiments provides good viewing angle. In one or more embodiments, the polarizing plate includes: a polarizer; and a stack of retardation layers formed on a surface of the polarizer, wherein the stack of retardation layers includes a second retardation layer and a first retardation stacked on the polarizer in sequence from the surface of the polarizer, the second retardation layer being a non-liquid crystal layer, and wherein the stack of retardation layers has an out-of-plane retardation of −40 nm or more to less than 0 nm at a wavelength of 550 nm and satisfies the following Relation 1:

$$1.1 \le Rth(450)/Rth(550) \le 1.5, \qquad \text{Relation 1}$$

where Rth(450) and Rth(550) are out-of-plane retardations (unit: nm) of the stack of retardation layers at wavelengths of 450 nm and 550 nm, respectively.

As described below, the stack of retardation layers may be disposed between the polarizer and an optical display panel. To achieve improvement in durability under high temperature and high humidity conditions or at high temperature, the stack of retardation layers includes a non-liquid crystal layer as the second retardation layer and is formed to a suitable thickness instead of indefinitely increasing the thickness of the polarizing plate, thereby improving durability and frontal contrast ratio even under high temperature and high humidity conditions or at high temperature, and securing good visibility and good clarity on a black screen while reducing light leakage and color shift at a lateral side.

The polarizing plate according to one or more embodiments may be used as a viewer-side polarizing plate or a light source-side polarizing plate in a lateral electric field liquid crystal type optical display apparatus, for example, an IPS or FFS-mode liquid crystal display. In addition, the polarizing plate according to one or more embodiments may be used as an antireflection polarizing plate in a light emitting diode display, such as an OLED and the like. Here, "viewer-side polarizing plate" is a polarizing plate disposed to receive light emitted from a liquid crystal panel.

Next, the polarizing plate according to an embodiment of the invention will be described.

Stack of Retardation Layers

The stack of retardation layers is disposed between the polarizer and an optical display panel. The stack of retardation layers suppresses or prevents elution of dichroic pigments and variation in degree of polarization and light transmittance after the polarizing plate is left under high temperature and high humidity conditions or at high temperature for a long period of time. The stack of retardation layers increases frontal contrast ratio and provides good visibility and good clarity on a black screen while reducing light leakage and color shift at a lateral side.

The stack of retardation layers may be disposed on a light exit surface of the polarizer (for a light source-side polarizing plate) with respect to internal light, or may be disposed on a light incidence surface of the polarizer (for a viewer-side polarizing plate) with respect to internal light. Here, "internal light" may be light emitted from a backlight unit.

The stack of retardation layers includes the second retardation layer and the first retardation layer stacked in sequence from the polarizer.

In an embodiment, the second retardation layer may be directly formed on the first retardation layer. Here, "directly formed" means that no adhesive layer or bonding layer is formed between the first retardation layer and the second retardation layer. In another embodiment, the second retardation layer may be formed on the first retardation layer via an adhesive layer, for example, a pressure-sensitive adhesive (PSA) layer. When the second retardation layer is formed directly on the first retardation layer, or via the adhesive layer, the stack of retardation layers satisfies all retardation characteristics described below.

The stack of retardation layers has an out-of-plane retardation of −40 nm or more to less than 0 nm at a wavelength of 550 nm and satisfies the following Relation 1. As a result, the stack of retardation layers can easily increase frontal contrast ratio and provides good visibility and good clarity on a black screen while reducing light leakage and color shift at a lateral side.

$$1.1 \leq Rth(450)/Rth(550) \leq 1.5, \qquad \text{Relation 1}$$

where Rth(450) and Rth(550) are out-of-plane retardations (unit: nm) of the stack of retardation layers at wavelengths of 450 nm and 550 nm, respectively.

For example, the stack of retardation layers may have an Rth(550) value of −40, −39, −38, −37, −36, −35, −34, −33, −32, −31, −30, −29, −28, −27, −26, −25, −24, −23, −22, −21, −20, −19, −18, −17, −16, −15, −14, −13, −12, −11, −10, −10, −9, −8, −7, −6, −5, −4, −3, −2, −1 or 0 nm. In an embodiment, the stack of retardation layers may have an Rth(550) value of −25 nm to −5 nm, −25 nm to −10 nm, or −20 nm to −10 nm.

For example, the stack of retardation layers may have an Rth(450)/Rth(550) value of 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, or 1.5. In an embodiment, the stack of retardation layers may have an Rth(450)/Rth(550) value of 1.15 to 1.5, and, in an embodiment, 1.2 to 1.4.

In an embodiment, the stack of retardation layers may have a negative Rth(450) value as in Rth(550). For example, the stack of retardation layers may have an Rth(450) value of −20 to −5 nm, for example, −20, −19, −18, −17, −16, −15, −14, −13, −12, −11, −10, −9, −8, −7, −6 or −5 nm, and, in an embodiment, −12 nm to −7 nm. Within this range, the stack of retardation layers can easily satisfy Relation 1.

The stack of retardation layers may further satisfy the following Relation 2. As a result, the polarizing plate can easily increase frontal contrast ratio and provides good visibility and good clarity on a black screen while reducing light leakage and color shift at a lateral side.

$$0.1 \leq Rth(650)/Rth(550) \leq 1.0, \qquad \text{Relation 2}$$

where Rth(650) and Rth(550) are out-of-plane retardations (unit: nm) of the stack of retardation layers at wavelengths of 650 nm and 550 nm, respectively.

For example, the stack of retardation layers may have an Rth(650)/Rth(550) value of 0.1, 0.2, 0.3, 0.4, 0.5, 0.6, 0.7, 0.8, 0.9, or 1.0. In an embodiment, the stack of retardation layers may have an Rth(650)/Rth(550) value of 0.2 to 1.0, and, in an embodiment, 0.5 to 0.9.

In an embodiment, the stack of retardation layers may have a negative Rth(650) value as in Rth(550). For example, the stack of retardation layers may have an Rth(650) value of −20 to −1 nm, for example, −20, −19, −18, −17, −16, −15, −14, −13, −12, −11, −10, −9, −8, −7, −6, −5, −4, −3, −2 or −1 nm, and, in an embodiment, −13 nm to −5 nm. Within this range, the stack of retardation layers can easily satisfy Relation 2.

The stack of retardation layers exhibits different wavelength dispersion of the out-of-plane retardation depending upon wavelength from wavelength dispersion of the in-plane retardation.

Referring to FIG. 1, the stack of retardation layers exhibits positive wavelength dispersion with respect to in-plane retardation and out-of-plane retardation depending upon wavelengths. However, it can be seen that wavelength dispersion of the out-of-plane retardation depending upon wavelengths is different than wavelength dispersion of the in-plane retardation depending upon wavelengths.

In an embodiment, the stack of retardation layers may satisfy the following Relations 3 and 4. As a result, the polarizing plate can easily realize the effects of the present invention.

$$Rth(450)/Rth(550) > Re(450)/Re(550) \qquad \text{Relation 3}$$

$$Re(650)/Re(550) > Rth(650)/Rth(550) \qquad \text{Relation 4}$$

where Re(450), Re(550), and Re(650) are in-plane retardations (unit: nm) of the stack of retardation layers at wavelengths of 450 nm, 550 nm, and 650 nm, respectively; and Rth(450), Rth(550), Rth(650) are out-of-plane retardations (unit: nm) of the stack of retardation layers at wavelengths of 450 nm, 550 nm, and 650 nm, respectively.

In an embodiment, the stack of retardation layers may satisfy the following Relations 5 and 6. As a result, the polarizing plate can further reduce luminance difference and color shift.

$$1 < Re(450)/Re(550) \leq 1.1; \qquad \text{Relation 5}$$

$$0.9 \leq Re(650)/Re(550) < 1, \qquad \text{Relation 6}$$

where Re(450), Re(550), and Re(650) are in-plane retardations (unit: nm) of the stack of retardation layers at wavelengths of 450 nm, 550 nm, and 650 nm, respectively.

For example, the stack of retardation layers may have an Re(450)/Re(550) value of 1.001 to 1.05 and an Re(650)/Re(550) value of 0.9 to 0.99.

In Relations 5 and 6, the stack of retardation layers may have an Re(550) of 110 nm to 135 nm, and, in an embodiment, 115 nm to 130 nm. The stack of retardation layers may have an Re(450) of 105 nm to 140 nm, and, in an embodiment, 115 nm to 130 nm. The stack of retardation layers may have an Re(650) of 105 nm to 140 nm, and, in an embodiment, 115 nm to 130 nm. Within this range, wavelength dispersion of the stack of retardation layers can be easily realized.

The stack of retardation layers may have a thickness of 45 μm to 90 μm, and, in an embodiment, 40 μm to 85 μm, and, in an embodiment, 40 μm to 80 μm.

Within this range, the stack of retardation layers can be used in the polarizing plate.

First Retardation Layer

In an embodiment, the first retardation layer is a positive (+) A layer (nx>ny=nz) and may be applied to an IPS or FFS-mode liquid crystal display in combination with the second retardation layer corresponding to a positive (+) C layer, whereby the polarizing plate can easily increase contrast ratio and viewing angle while minimizing or reducing color shift.

In an embodiment, the first retardation layer may have an Re of 100 nm to 160 nm at a wavelength of 550 nm. Within this range, the first retardation layer can be applied to an IPS-mode liquid crystal display in combination with the second retardation layer, thereby improving contrast ratio and viewing angle while minimizing or reducing color shift. For example, the first retardation layer may have an Re of 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159 or 160 nm, at a wavelength of 550 nm. In an embodiment, the first retardation layer may have an Re of 120 nm to 150 nm, and, in an embodiment, 120 nm to 130 nm, at a wavelength of 550 nm.

In an embodiment, the first retardation layer may have an Rth of 50 nm to 85 nm, for example, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 nm, and, in an embodiment, 50 to 80 nm, and, in an embodiment, 55 nm to 70 nm, at a wavelength of 550 nm. Within this range, the first retardation layer can achieve the above range of Re.

In an embodiment, the first retardation layer may have an NZ of 0.9 to 1.1, for example, 0.9, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, or 1.1, and, in an embodiment, 0.95 to 1.05, and, in an embodiment, 1 to 1.02, at a wavelength of 550 nm. Within this range, the first retardation layer can achieve the above range of Re.

The first retardation layer may exhibit positive wavelength dispersion (Re(450)>Re(550)>Re(650)) or flat wavelength dispersion (Re(450)=Re(550)=Re(650)).

In an embodiment, the first retardation layer may have a short wavelength dispersion of in-plane retardation (Re(450)/Re(550)) in a range of 1.0 to 1.1 and a long wavelength dispersion of in-plane retardation (Re(650)/Re(550)) in a range of 0.9 to 1.0. Within this range, the first retardation layer can suppress lateral light leakage while reducing luminance in dark mode. In an embodiment, the first retardation layer may have a short wavelength dispersion of in-plane retardation in a range of 1.001 to 1.009 and a long wavelength dispersion of in-plane retardation in a range of 0.98 to 1.0.

In an embodiment, the first retardation layer may have an Re of 100 nm to 165 nm, and, in an embodiment, 105 nm to 163 nm, at a wavelength of 450 nm, and an Re of 95 nm to 155 nm, and, in an embodiment, 96 nm to 153 nm, at a wavelength of 650 nm. Within this range, the first retardation layer can easily realize the short wavelength dispersion and the long wavelength dispersion within the above ranges.

The first retardation layer may have a total light transmittance of 90% or more, for example, 90% to 100%, and a haze of 0.3% or less, for example, 0% to 0.3%, or 0.1% to 0.3%. Within this range, the first retardation layer can be applied to the stack of retardation layers.

The first retardation layer may have a thickness of 70 μm or less, for example, greater than 0 μm to 70 μm, or 20 μm to 70 μm, and, in an embodiment, 20 μm to 50 μm. Within this range, the first retardation layer can be used in the polarizing plate.

In an embodiment, the first retardation layer is a non-liquid crystal film and may include a stretched film formed of an optically transparent resin. Herein, "non-liquid crystalline film" may refer to a film that is not formed of any of a liquid crystal monomer, a liquid crystal oligomer, and a liquid crystal polymer, or a film formed of a material that is not converted into a liquid crystal monomer, a liquid crystal oligomer, or a liquid crystal polymer upon irradiation with light.

For example, the first retardation layer may be a film formed of at least one selected from among cellulose based resins including triacetylcellulose and the like, polyester based resins including polyethylene terephthalate (PET), polybutylene terephthalate, polyethylene naphthalate, and polybutylene naphthalate, cyclic olefin copolymer (COC) based resins, cyclic olefin polymer (COP) based resins, polycarbonate based resins, polyether sulfone based resins, polysulfone based resins, polyamide based resins, polyimide based resins, polyolefin based resins, polyarylate based resins, polyvinyl alcohol based resins, polyvinyl chloride based resins, polyvinylidene chloride based resins, and acrylic based resins.

In an embodiment, the first retardation layer may include a cyclic olefin polymer (COP) based film or a cyclic olefin copolymer (COC) based film. The cyclic olefin polymer (COP) based film can be effective in improving contrast ratio and viewing angle while minimizing or reducing color shift when the polarizing plate according to the present invention is used in an IPS or FFS-mode liquid crystal display.

The first retardation layer may be a hydrophobic film. In an embodiment, the first retardation layer may include a film formed of a resin having a positive (+) inherent birefringence. For example, the first retardation layer may include at least one selected from among a cyclic olefin polymer (COP) based film and a cyclic olefin copolymer (COC) based film.

In an embodiment, the first retardation layer may have a water vapor transmission rate of 1 g/m²/day or more, for example, 1 g/m²/day to 30 g/m²/day, or 1 g/m²/day to 10 g/m²/day. Within this range, the first retardation layer can easily improve durability of the polarizing plate under high temperature and high humidity conditions or at high temperature.

In an embodiment, the first retardation layer may have a glass transition temperature of 130° C. or more, for example, 130° C. to 200° C. Within this range, the first retardation layer can easily improve durability of the polarizing plate under high temperature/humidity conditions or at high temperature.

The first retardation layer may be a film prepared by uniaxially stretching a non-stretched film for the first retardation layer in the MD or TD or in a direction oblique to the MD. In an embodiment, the first retardation layer may be a film prepared by uniaxially stretching a non-stretched film for the first retardation layer in the MD. Here, stretching conditions, such as a stretching ratio, a stretching temperature, and a stretching method, may be adjusted such that the first retardation layer has an Re within the range set forth above at a wavelength 550 nm. The non-stretched film for the first retardation layer may be prepared by melt extrusion or solution casting of the composition for the first retardation layer, without being limited thereto. Here, melt extrusion or solvent solution casting may be carried out under typical conditions known to those skilled in the art.

The first retardation layer has an in-plane slow axis and an in-plane fast axis, and the slow axis of the first retardation layer may be substantially parallel to a light absorption axis of the polarizer. For example, assuming the light absorption axis of the polarizer is 0°, the slow axis of the first retardation layer may be at an angle of −5° to 5°. For example, the slow axis of the first retardation layer may be at an angle of −5°, −4°, −3°, −2°, −1°, 0°, 1°, 2°, 3°, 4°, or 5°, and, in an embodiment, −0.5° to 0.5°, and, in an embodiment, −0.1° to 0.1°. Within this range, the first retardation layer can assist in satisfying Relation 1.

The first retardation layer may further include a primer layer formed on at least one surface thereof. In an embodiment, the first retardation layer may include a primer layer formed on a surface thereof adjoining the second retardation layer, thereby improving adhesion between the one surface of the first retardation layer and the second retardation layer.

Second Retardation Layer

In an embodiment, the second retardation layer is a positive (+) C layer (nz>nx=ny) and may be applied to an IPS or FFS-mode liquid crystal display to improve contrast ratio and viewing angle while minimizing or reducing color shift in combination with the first retardation layer, which is the positive A layer.

In an embodiment, the second retardation layer may have an Rth of −100 nm to −50 nm at a wavelength of 550 nm. Within this range, the second retardation layer can improve contrast ratio and viewing angle while minimizing or reducing color shift when applied to the liquid crystal display. For example, the second retardation layer may have an Rth of −100, −99, −98, −97, −96, −95, −94, −93, −92, −91, −90, −89, −88, −87, −86, −85, −84, −83, −82, −81, −80, −79, −78, −77, −76, −75, −74, −73, −72, −71, −70, −69, −68, −67, −66, −65, −64, −63, −62, −61, −60, −59, −58, −57, −56, −55, −54, −53, −52, −51 or −50 nm at a wavelength of 550 nm. In an embodiment, the second retardation layer may have an Rth of −90 to −60 nm, and, in an embodiment, −85 to −65 nm, at a wavelength of 550 nm.

In an embodiment, the second retardation layer may have an Re of 10 nm or less, for example, 0 nm to 10 nm, at a wavelength of 550 nm. Within this range, it is easy to ensure that the second retardation layer has an Rth within the range set forth above.

For both Re and Rth, the second retardation layer may exhibit positive wavelength dispersion (Re(450)>Re(550) >Re(650), Rth(450)<Rth(550)<Rth(650)) or flat wavelength dispersion (Re(450)=Re(550)=Re(650), Rth(450)=Rth(550) =Rth(650)).

In an embodiment, the second retardation layer may satisfy the following Relations 7 and 8. As a result, the polarizing plate can easily satisfy Relation 1.

$$1.0 \leq Re2(450)/Re2(550) \leq 1.1; \qquad \text{Relation 7}$$

$$1.0 \leq Rth2(450)/Rth2(550) \leq 1.1, \qquad \text{Relation 8}$$

where Re2(450) and Re2(550) are in-plane retardations (unit: nm) of the second retardation layer at wavelengths of 450 nm and 550 nm, respectively, and Rth2(450) and Rth2(550) are out-of-plane retardations (unit: nm) of the second retardation layer at wavelengths of 450 nm and 550 nm, respectively.

The second retardation layer may have a total light transmittance of 90% or more, for example, 90% to 100%, and a haze of 1% or less, for example, 0% to 0.8%, or 0.1% to 0.7%. Within this range, the second retardation layer can be used in the polarizing plate.

The second retardation layer may have a thickness of 10 μm or less, for example, greater than 0 μm to 10 μm, for example, 2 μm to 8 μm. Within this range, the thickness of the stack of retardation layers can be reduced.

The second retardation layer may have a lower index of refraction than the first retardation layer and may have an index of refraction of 1 to 2, and, in an embodiment, 1.4 to 1.6, and, in an embodiment, 1.5 to 1.6.

In an embodiment, the second retardation layer may have a water vapor transmission rate of 1 $g/m^2/day$ or more, for example, 1 $g/m^2/day$ to 50 $g/m^2/day$. Within this range, the second retardation layer can easily improve durability of the polarizing plate under high temperature/humidity conditions or at high temperature.

In an embodiment, the second retardation layer may have a glass transition temperature of 130° C. or more, for example, 130° C., 135° C., 140° C., 145° C., 150° C., 155° C., 160° C., 165° C., 170° C., 175° C., 180° C., 185° C., 190° C., 195° C., or 200° C., for example, 130° C. to 200° C. Within this range, the second retardation layer can easily improve durability of the polarizing plate under high temperature/humidity conditions or at high temperature.

The second retardation layer is formed of a different material than the first retardation layer and may be formed of a resin that has different birefringence than the first retardation layer and exhibits hydrophobic properties and a negative (−) inherent birefringence.

In an embodiment, the second retardation layer is a non-liquid crystal layer. As a result, the polarizing plate can exhibit further improved durability after being left under high temperature and high humidity conditions or at high temperature for a long period of time.

The second retardation layer includes a cellulose based compound and/or a polystyrene based compound as a main component. These compounds may be a polymer, an oligomer, and the like. In an embodiment, each of the cellulose based compound and the polystyrene based compound may contain a halogen. The halogen may be fluorine, chlorine, iodine, or bromine, and, in an embodiment, fluorine.

The resin having a negative intrinsic birefringence includes a polymer having a negative intrinsic birefringence. The polymer having a negative intrinsic birefringence may include at least one selected from among, for example, a homopolymer of styrene or a styrene derivative, a polystyrene copolymer of styrene or a styrene derivative and a comonomer, a polyacrylonitrile polymer, a poly(methyl methacrylate) copolymer, and a cellulose copolymer including cellulose esters and the like, without being limited thereto. The comonomer may include at least one selected from among acrylonitrile, maleic anhydride, methyl methacrylate, and butadiene. In an embodiment, the second retardation layer may include a polystyrene compound and/ or a cellulose compound, and, in an embodiment, a polystyrene compound.

In an embodiment, the cellulose ester based compound may include a cellulose ester based polymer including at least a unit, in which at least hydrogen of some hydroxyl groups [a $C_2$ hydroxyl group, a $C_3$ hydroxyl group or a $C_6$ hydroxyl group] of a sugar monomer constituting cellulose are substituted with an acyl group, as represented by the following Formula 1. Here, the acyl group may be substituted or unsubstituted.

Formula 1 where n is an integer of 1 or more.

The polystyrene based compound may include a repeat unit of the following Formula 2.

Formula 2 where:

is a linking site; $R^1$, $R^2$, and $R^3$ are each independently hydrogen, an alkyl group, a substituted alkyl group, or a halogen; each R is independently an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxycarbonyl group, or a cyano group; at least one of $R^1$, $R^2$, and $R^3$ is a halogen and/or at least one R is a halogen; and n is an integer of 0 to 5.

A composition for the second retardation layer may further include a halogen-free styrene based polymer, for example, halogen-free polystyrene.

The composition for the second retardation layer may further include an additive. The additive may serve to adjust wavelength dispersion. The additive may include a fused aromatic ring-containing additive, such as 2-naphthylbenzoate, anthracene, phenanthrene, and 2,6-naphthalenedicarboxylic acid diester. In an embodiment, the fused aromatic ring-containing additive may be present in an amount of 0.1 wt % to 30 wt %, and, in an embodiment, 1 wt % to 10 wt %, in the composition for the second retardation layer. Within this range, the fused aromatic ring-containing additive can adjust retardation expression and wavelength dispersion.

The composition for the second retardation layer may further include typical additives known to those skilled in the art. The additives may include any of pigments, an antioxidant, an antistatic agent, and a heat stabilizer, without being limited thereto.

The second retardation layer is a coating layer cured by heat curing or photocuring, and may be prepared by any typical method known to those skilled in the art.
Adhesive Layer The adhesive layer may be used to attach the first retardation layer to the second retardation layer.

The adhesive layer may be formed of a typical adhesive composition known to those skilled in the art. For example, the adhesive layer may be formed of a (meth)acrylic based resin, an epoxy based resin, a silicone based resin, an epoxy (meth)acrylic based resin, or the like. For example, the adhesive layer may be a pressure sensitive adhesive (PSA) layer. In an embodiment, the adhesive layer is a (meth)acrylic based adhesive layer.

To further improve durability of the polarizing plate through improvement in adhesion between the adhesive layer and the first retardation layer, a water contact angle on a surface of the first retardation layer to which the adhesive layer is bonded may be adjusted. In an embodiment, the surface of the first retardation layer to which the adhesive layer is bonded may have a water contact angle of 60° or less, for example, 10° to 60°, or 20° to 50°. Within this range, the adhesive layer can be well bonded thereto, thereby improving durability. Here, "water contact angle" is measured at 25° C. and can be measured by a typical method known to those skilled in the art.

The water contact angle of 60° or less may be achieved by corona treatment of the first retardation layer. Corona treatment may be performed by treating the first retardation layer at 100 W to 1300 W while moving the first retardation line at a line speed of 10 m/min to 20 m/min.

To further improve durability of the polarizing plate through improvement in adhesion between the adhesive layer and the first retardation layer, the adhesive layer may have a glass transition temperature of –40° C. or less, for example, –60° C., –59° C., –58° C., –57° C., –56° C., –55° C., –54° C., –53° C., –52° C., –51° C., –50° C., –49° C., –48° C., –47° C., –46° C., –45° C., –44° C., –43° C., –42° C., –41° C., or –40° C., and, in an embodiment, –60° C. to –40° C. Within this range, the adhesive layer can have a glass transition temperature within a suitable range, thereby improving adhesion between the adhesive layer and the first retardation layer.

The glass transition temperature of –40° C. or less may be realized through adjustment of the kind and/or the content of each component in a composition for the adhesive layer.

In an embodiment, the (meth)acrylic adhesive layer may be formed of a composition for the adhesive layer, which includes a (meth)acrylic copolymer and a curing agent. The (meth)acrylic copolymer and the curing agent may be selected from typical kinds known to those skilled in the art.

In an embodiment, the adhesive layer may have a thickness of 5 μm to 30 μm, for example, 10 μm to 25 μm. Within this range, the adhesive layer can be used in the polarizing plate.
Polarizer The polarizer reduces color shift and reflectivity at all viewing angles through linear polarization of external light or light received from the stack of retardation layers.

The polarizer may have a polarization degree of 99% or more and a single light transmittance (Ts) of 42% or more. By satisfying both the polarization degree and the single light transmittance, the polarizer can achieve remarkable reduction in reflectivity when mounted on the stack of retardation layers. Herein, the single light transmittance means single light transmittance (Ts) measured in the visible spectrum, for example, at a wavelength of 400 nm to 700 nm, and may be measured by a typical method known to those skilled in the art. The polarization degree may be measured by a typical method known to those skilled in the art. In an embodiment, the polarizer may have a polarization degree of 99% to 99.9999% and a light transmittance of 42% to 50%.

A light absorption axis of the polarizer may correspond to a stretching direction, for example, the machine direction (MD) of the polarizer, upon manufacture of the polarizer from a polyvinyl alcohol based film. The polarizer may include a polyvinyl alcohol-based polarizer manufactured by uniaxially stretching a polyvinyl alcohol based film. In an embodiment, the polarizer may be manufactured by subjecting the polyvinyl alcohol based film to dyeing, stretching, crosslinking, and color correction processes. The polarizer having both the polarization degree and the light transmittance described above may be realized through suitable adjustment of conditions for the dyeing, stretching, crosslinking, and color correction processes. In an embodiment, the polarizer may have a thickness of 5 μm to 40 μm. Within this range, the polarizer can be used in the polarizing plate.

In addition to the stack of retardation layers, the polarizing plate may include at least one protective layer.

In an embodiment, the protective layer may be stacked on the other surface of the polarizer.

Protective Layer

The protective layer may be formed on an upper surface of the polarizer to protect the polarizer. The protective layer can improve reliability and mechanical strength of the polarizing plate by protecting the polarizer. If mechanical properties of the polarizing plate can be secured even without the protective layer, the protective layer may be omitted. The protective layer may be formed singularly or in plural on the upper surface of the polarizer.

The protective layer may include an optically clear protective film and/or an optically clear protective coating layer. The protective film may include a film formed of at least one selected from among cellulose based resins including triacetylcellulose (TAC) and the like, cyclic polyolefin based resins including amorphous cyclic polyolefin (COP) based and the like, polycarbonate based resins, polyester based resins including polyethylene terephthalate (PET) and the like, polyether sulfone based resins, polysulfone based resins, polyamide based resins, polyimide based resins, non-cyclic polyolefin based resins, poly(meth)acrylate based resins including poly(methyl methacrylate) and the like, polyvinyl alcohol based resins, polyvinyl chloride based resins, and polyvinylidene chloride based resins, without being limited thereto.

The protective coating layer may be formed of an actinic radiation curable resin composition including an actinic radiation curable compound and a polymerization initiator. The actinic radiation curable compound may include at least one selected from among a cationic polymerizable curable compound, a radical polymerizable curable compound, a urethane resin, and a silicone-based resin.

The protective layer may be a non-retardation film or may have a certain range of in-plane retardation (e.g., a predetermined range of in-plane retardation). For example, the protective layer may have an in-plane retardation of less than 5,000 nm, 5000 nm or more, 120 nm to 160 nm, or 5 nm to 0 nm, at a wavelength of 550 nm. Within this range, the protective layer can protect the polarizing plate without affecting the effect of the stack of retardation layers.

In an embodiment, the protective layer may have a thickness of 10 μm or less, 5 μm to 300 μm, 5 μm or less, or 5 μm to 200 μm. Within this range, the protective layer can be used in the polarizing plate.

The polarizing plate may further include a functional coating layer on an upper surface of the protective layer. The functional coating layer may include at least one selected from among a hard coating layer, an anti-fingerprint layer, an anti-reflection layer, an anti-glare layer, a low reflectivity layer, and an ultra-low reflectivity layer, without being limited thereto.

In an embodiment, the protective layer may have a low water vapor transmission rate to further improve durability of the polarizing plate after the polarizing plate is left under high temperature and high humidity conditions. For example, the protective layer may have a water vapor transmission rate of 1 $g/m^2$/day or more, for example, 1 $g/m^2$/day to 100 $g/m^2$/day. Within this range, the polarizing plate can have good durability and the protective layer can be easily formed.

At least one of the protective layer, the adhesive layer, and a bonding layer may be further formed between the polarizer and the stack of retardation layers and/or on a lower surface of the stack of retardation layers. The protective layer may be substantially the same as described above.

FIG. 2 to FIG. 5 are cross-sectional views of polarizing plates according to embodiments of the present invention. In FIG. 2 to FIG. 5, an upper surface of the polarizer refers to a light exit surface thereof and a lower surface of the polarizer refers to a light incidence surface thereof.

Figure 2:
FIG. 2 is a cross-sectional view of a polarizing plate according to an embodiment of the present invention.

Referring to FIG. 2, in an embodiment, the polarizing plate includes a polarizer 100, a first protective layer 300 formed on an upper surface of the polarizer 100, and a stack of retardation layers formed on a lower surface of the polarizer 100, wherein the stack of retardation layers includes a second retardation layer 220 and a first retardation layer 210 stacked on the polarizer 100 in sequence from the polarizer 100.

Figure 3:
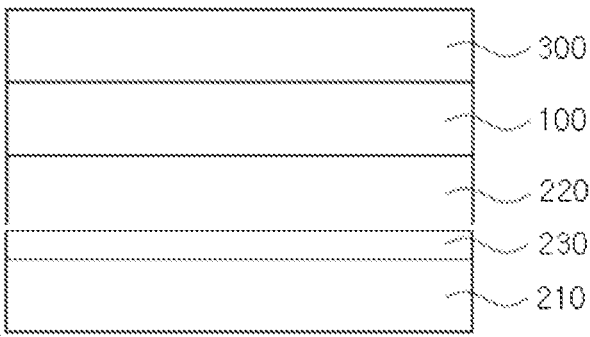
FIG. 3 is a cross-sectional view of a polarizing plate according to another embodiment of the present invention.

Referring to FIG. 3, in an embodiment, the polarizing plate includes a polarizer 100, a first protective layer 300 on an upper surface of the polarizer 100, and a stack of retardation layers on a lower surface of the polarizer 100, wherein the stack of retardation layers includes a second retardation layer 220, an adhesive layer 230 and a first retardation layer 210 stacked on the polarizer 100 in sequence from the polarizer 100.

Figure 4:
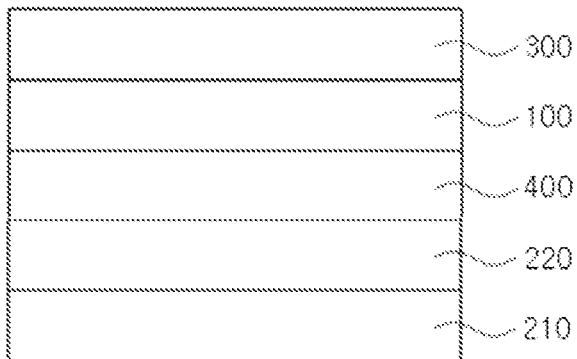
FIG. 4 is a cross-sectional view of a polarizing plate according to another embodiment of the present invention.

Referring to FIG. 4, in an embodiment, the polarizing plate includes a polarizer 100, a first protective layer 300 on an upper surface of the polarizer 100, and a second protective layer 400 and a stack of retardation layers formed on a lower surface of the polarizer 100, wherein the stack of retardation layers includes a second retardation layer 220 and a first retardation layer 210 stacked on the polarizer 100 in sequence from the polarizer 100.

Figure 5:
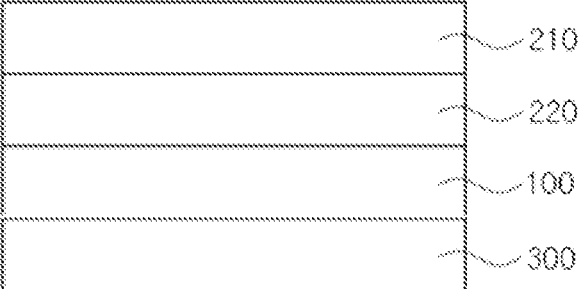
FIG. 5 is a cross-sectional view of a polarizing plate according to another embodiment of the present invention.

Referring to FIG. 5, in an embodiment, the polarizing plate includes a polarizer 100, a first protective layer 300 on a lower surface of the polarizer 100, and a stack of retardation layers on an upper surface of the polarizer 100, wherein the stack of retardation layers includes a second retardation layer 220 and a first retardation layer 210 stacked on the polarizer 100 in sequence from the polarizer 100.

Optical Display Apparatus

An optical display apparatus according to one or more embodiments of the present invention includes the polarizing plate according to an embodiment of the present invention. The optical display apparatus may include a liquid crystal display. The polarizing plate according to the present invention may be used as a viewer-side polarizing plate of the optical display apparatus. In an embodiment, the liquid crystal display may be an IPS or FFS-mode liquid crystal display.

The liquid crystal display may include a liquid crystal panel, a viewer-side polarizing plate at a side of the liquid crystal panel, and a light source-side polarizing plate at another side of the liquid crystal panel. A light absorption axis of a polarizer of the viewer-side polarizing plate may be substantially orthogonal to a light absorption axis of the light source-side polarizing plate.

In an embodiment, the liquid crystal display may include a liquid crystal panel, a viewer-side polarizing plate disposed on a surface of the liquid crystal panel, and a light source-side polarizing plate disposed on another surface of the liquid crystal panel. The viewer-side polarizing plate may include a first retardation layer, a second retardation layer, a polarizer, and a protective layer stacked in sequence from the liquid crystal panel. The light source-side polarizing plate may include a protective layer, a polarizer, and a protective layer stacked in sequence from the liquid crystal panel. Here, a light absorption axis (e.g., 0°) of the polarizer of the viewer-side polarizing plate may be substantially parallel to the slow axis (e.g., 0°) of the first retardation layer. The light absorption axis of the polarizer of the viewer-side polarizing plate is substantially orthogonal to each of a liquid crystal orientation (e.g., 90°) of the liquid crystal panel and the light absorption axis (e.g., 90°) of the polarizer of the light source-side polarizing plate.

In an embodiment, the liquid crystal display may include a liquid crystal panel, a viewer-side polarizing plate disposed on a surface of the liquid crystal panel, and a light source-side polarizing plate disposed on another surface of the liquid crystal panel. The light source-side polarizing plate may include a first retardation layer, a second retardation layer, a polarizer, and a protective layer stacked in sequence from the liquid crystal panel. The viewer-side polarizing plate may include a protective layer, a polarizer, and a protective layer stacked in sequence from the liquid crystal panel. Here, the light absorption axis (e.g., 0°) of the polarizer of the light source-side polarizing plate may be substantially parallel to the slow axis (e.g., 0°) of the first retardation layer. The light absorption axis of the polarizer of the light source-side polarizing plate is substantially orthogonal to each of the liquid crystal orientation (e.g., 90°) of the liquid crystal panel and the light absorption axis (e.g., 90°) of the polarizer of the viewer-side polarizing plate.

Next, the present invention will be described in further detail with reference to some examples. However, it is to be understood that these examples are provided for illustration and are not to be construed in any way as limiting the present invention.

Example 1

A polarizer (light transmittance: 44%, thickness: 10 μm) was manufactured by dyeing a polyvinyl alcohol based film (pre-stretching thickness: 60 μm, Kuraray Co., Ltd., Japan,) in an aqueous solution of iodine with 55° C., followed by uniaxially stretching the polyvinyl alcohol film to 6 times an initial length thereof in the MD of the film.

A first retardation layer (+A layer, Re: positive wavelength dispersion, thickness: 45 μm) was formed by uniaxially stretching a cyclic olefin polymer (COP) film (ZF, Zeon Co., Ltd.) to 2.3 times at 140° C. in the MD of the film. A fluorine-substituted polystyrene polymer-containing composition (VM, Eastman) was dissolved in methyl ethyl ketone to prepare a solution, which in turn was coated onto one surface of the first retardation layer and dried, thereby preparing a stack of retardation layers including a second retardation layer (non-liquid crystal layer, +C layer, thickness: 4 μm, Tg: 140° C., water vapor transmission rate: 30 g/m$^2$/day) formed on the first retardation layer.

A polarizing plate including a stack of the PET film, the polarizer, the second retardation layer, and the first retardation layer was manufactured by attaching a +C layer of the retardation layer to a lower surface of the polarizer via an adhesive layer, followed by attaching a protective film (polyethylene terephthalate (PET) film, DSG, water vapor transmission rate: 30 g/m$^2$/day, DNP) to an upper surface of the polarizer.

Examples 2 and 3

Polarizing plates were manufactured in the same manner as in Example 1 except that specifications of the first retardation layer and the second retardation layer were changed as listed in Table 1.

Example 4

A polarizer (light transmittance: 44%, thickness: 10 μm) was manufactured by dyeing a polyvinyl alcohol based film (pre-stretching thickness: 60 μm, Kuraray Co., Ltd., Japan,) in an aqueous solution of iodine with 55° C., followed by uniaxially stretching the dyed polyvinyl alcohol based film to 6 times an initial length thereof in the MD of the film.

A first retardation layer (+A layer, Re: positive wavelength dispersion, thickness: 45 μm) was formed by uniaxially stretching a cyclic olefin polymer (COP) film (ZF, Zeon Co., Ltd.) to 2.3 times at 140° C. in the MD of the film. An upper surface of the first retardation layer was subjected to corona treatment to have a water contact angle of 20°.

A fluorine-substituted polystyrene polymer-containing composition (VM, Eastman) was dissolved in methyl ethyl ketone to prepare a solution, which in turn was coated onto one surface of a release PET film and dried, followed by removing the release PET film and forming an adhesive layer (Tg: −45° C., (meth)acrylic adhesive layer) on an upper surface of the first retardation layer, thereby preparing a stack of retardation layers including a first retardation layer, an adhesive layer, and a second retardation layer (non-liquid crystal layer, +C layer, thickness: 3 μm, Tg: 140° C., water vapor transmission rate: 30 g/m$^2$/day) stacked in the stated sequence.

A polarizing plate including a stack of the PET film, the polarizer, the second retardation layer, the adhesive layer, and the first retardation layer was manufactured by attaching a +C layer of the retardation layer to a lower surface of the polarizer via an adhesive layer, followed by attaching a protective film (polyethylene terephthalate (PET) film, DSG, water vapor transmission rate: 30 g/m$^2$/day, DNP) to an upper surface of the polarizer.

Example 5

A polarizing plate was manufactured in the same manner as in Example 4 except that the water contact angle was changed through change of conditions for corona treatment on the first retardation layer and an adhesive layer (Tg: −40° C., (meth)acrylic adhesive layer) was used.

Comparative Examples 1 and 2

Polarizing plates were manufactured in the same manner as in Example 1 except that specifications of the first retardation layer and the second retardation layer were changed as listed in Table 1.

Comparative Example 3

A polarizing plate was manufactured in the same manner as in Example 1 except that a +C layer corresponding to a second retardation layer was formed using a composition for liquid crystal layers (LC, DNP).

A retardation value of each of the stack of retardation layers, the first retardation layer, and the second retardation layer was measured using an AxoScan (Axometry).

spherical coordinate system was measured in each of a white mode and a black mode using an EZCONTRAST X88RC (EZXL-176R-F422A4, ELDIM S. A.), followed by measuring a frontal contrast ratio according to Formula: Frontal contrast ratio=(luminance in white mode)/(luminance in black mode).

(3) Black luminance (no unit): With each of the polarizing plates manufactured in the Examples and Comparative Examples attached in the same manner as in (2), luminance at a lateral side (45°, 60°) was measured in a black mode using an EZCONTRAST X88RC (EZXL-176R-F422A4, ELDIM S. A). A lower luminance value indicates low light leakage.

(4) Color shift (no unit): With each of the polarizing plates manufactured in the Examples and Comparative Examples attached in the same manner as in (2), a color coordinate distance between (60°, 45°) and (60°, 135°) in the color coordinate (x, y) was obtained. A lower color coordinate distance indicates a lower color shift at a lateral side.

TABLE 1

| | | Example | | | | | Comparative Example | | |
|---|---|---|---|---|---|---|---|---|---|
| | | 1 | 2 | 3 | 4 | 5 | 1 | 2 | 3 |
| Protective layer | | PET | PET | PET | PET | PET | PET | PET | PET |
| Second retardation layer (+C layer) | Rth(nm) | −70 | −80 | −70 | −70 | −70 | −30 | −80 | −80 |
| | Rth(450)/Rth(550) | 1.05 | 1.05 | 1.05 | 1.05 | 1.05 | 1.05 | 1.05 | 1.15 |
| First retardation layer (+A layer) | Re(nm) | 120 | 123 | 120 | 120 | 120 | 120 | 130 | 120 |
| | Rth(nm) | 60 | 64 | 56 | 60 | 60 | 130 | 68 | 62 |
| | NZ | 1 | 1 | 1 | 1 | 1 | 1.58 | 1 | 1.02 |
| | Angle *(°) | 0.1 | −0.1 | 0.1 | 0.1 | 0.1 | 0.2 | 1.3 | −0.1 |
| | Re(450)/Re(550) | 1.005 | 1.005 | 1.005 | 1.005 | 1.005 | 1.01 | 1.01 | 1.02 |
| Stack of +C/+A layers | Rth(nm) | −10 | −16 | −14 | −10 | −10 | 100 | −12 | −18 |
| | Re(450)/Re(550) | 1.005 | 1.008 | 1.005 | 1.005 | 1.005 | 1.01 | 1.01 | 1.02 |
| | Rth(450)/Rth(550) | 1.35 | 1.25 | 1.25 | 1.35 | 1.35 | 0.98 | 1.67 | 1.88 |
| Water contact angle (°) of +A layer | | — | — | — | 20 | 40 | — | — | — |
| Tg (° C.) of adhesive layer | | — | — | — | −45 | −40 | — | — | — |
| High temperature/humidity durability | | OK | OK | OK | OK | OK | OK | OK | NG |
| High temperature durability | | OK | OK | OK | OK | OK | OK | OK | NG |
| Frontal contrast ratio | | 1201 | 1215 | 1209 | 1203 | 1207 | 1008 | 731 | 1185 |
| Black luminance | | 1.1 | 1.2 | 1.7 | 1.1 | 1.1 | 7.4 | 10.3 | 4.3 |
| Color shift | | 0.23 | 0.25 | 0.26 | 0.23 | 0.23 | 0.13 | 0.14 | 0.62 |

*Angle: Angle of slow axis of +A layer with respect to light absorption axis (0°) of polarizer (1) High temperature/humidity durability and high temperature durability: A specimen was prepared by cutting the polarizing plate to a size of 10 cm×10 cm.

Initial values of polarization degree and light transmittance of the specimen were measured. The specimen was left in a chamber under conditions of 60° C. and 90% RH for 250 hours, followed by measurement of the polarization degree and light transmittance. For measured values of the polarization degree and the light transmittance before and after the specimen was left under the above conditions for 250 hours, a difference of 3% or more was rated as NG and a difference of less than 3% was rated as OK, and for appearance evaluation, generation of bubbles was rated as NG. The specimen was left in the chamber at 80° C. for 250 hours. High temperature durability was evaluated in the same manner. The light transmittance and the polarization degree were measured using a V7100 (JASCO).

(2) Frontal contrast ratio (no unit): With each of the polarizing plates manufactured in the Examples and Comparative Examples attached to a 55" TV instead of a viewer-side polarizing plate, luminance at a front side (0°, 0°) in the As shown in Table 1, the polarizing plates according to the present invention exhibited good durability under high temperature and high humidity conditions and at high temperature. The polarizing plates according to the present invention provided good frontal contrast ratios while suppressing light leakage and color shift at a lateral side.

By contrast, the polarizing plate of Comparative Example 3 including the liquid crystal layer as the second retardation layer exhibited poor durability under high temperature/humidity conditions and at high temperature. The polarizing plate of Comparative Example 1, which failed to satisfy Rth of the retardation layer at a wavelength of 550 nm and Relation 1, had a lower contrast ratio than the polarizing plates of Examples and exhibited significant light leakage at a lateral side. The polarizing plate of Comparative Example 2 exhibited significant light leakage at a lateral side, causing reduction in color shift.

Although some example embodiments have been described herein, it is to be understood that various modifications, changes, alterations, and equivalent embodiments can be made by those skilled in the art without departing from the spirit and scope of the invention.

What is claimed is:

1. A polarizing plate comprising: a polarizer; and a stack of retardation layers on a surface of the polarizer, wherein the stack of retardation layers comprises a second retardation layer and a first retardation layer stacked on the polarizer in sequence from the surface of the polarizer, the second retardation layer being a non-liquid crystal layer, and wherein the stack of retardation layers has an out-of-plane retardation of −40 nm or more to less than 0 nm at a wavelength of 550 nm and satisfies the following $$1.1 \leq Rth(450)/Rth(550) \leq 1.5, \qquad \text{Relation 1}$$

where Rth(450) and Rth(550) are out-of-plane retardations (unit: nm) of the stack of retardation layers at wavelengths of 450 nm and 550 nm, respectively.

2. The polarizing plate as claimed in claim 1, wherein the stack of retardation layers has an out-of-plane retardation of −25 nm to −5 nm at a wavelength of 550 nm.

3. The polarizing plate as claimed in claim 1, wherein the stack of retardation layers satisfies the following Relations 3 and 4:

$$Rth(450)/Rth(550) > Re(450)/Re(550); \qquad \text{Relation 3}$$

$$Re(650)/Re(550) > Rth(650)/Rth(550), \qquad \text{Relation 4}$$

where Re(450), Re(550), and Re(650) are in-plane retardations (unit: nm) of the stack of retardation layers at wavelengths of 450 nm, 550 nm, and 650 nm, respectively.

4. The polarizing plate as claimed in claim 1, wherein the stack of retardation layers satisfies the following Relation 5:

$$1 < Re(450)/Re(550) \leq 1.1,$$

where Re(450) and Re(550) are in-plane retardations (unit: nm) of the stack of retardation layers at wavelengths of 450 nm and 550 nm, respectively.

5. The polarizing plate as claimed in claim 1, wherein the stack of retardation layers satisfies the following Relation 2:

$$0.1 \leq Rth2(650)/Rth(550) \leq 1.0,$$

where Rth(650) and Rth(550) are out-of-plane retardations (unit: nm) of the stack of retardation layers at wavelengths of 650 nm and 550 nm, respectively.

6. The polarizing plate as claimed in claim 1, wherein the second retardation layer satisfies the following Relation 8:

$$1.0 \leq Rth2(450)/Rth2(550) \leq 1.1,$$

where Rth2(450) and Rth2(550) are out-of-plane retardations (unit: nm) of the second retardation layer at wavelengths of 450 nm and 550 nm, respectively.

7. The polarizing plate as claimed in claim 1, wherein the second retardation layer has a water vapor transmission rate of 1 g/m$^2$/day or greater.

8. The polarizing plate as claimed in claim 1, wherein the second retardation layer has a glass transition temperature of 130° C. or greater.

9. The polarizing plate as claimed in claim 1, wherein the second retardation layer comprises at least one selected from among a cellulose based compound and a polystyrene based compound.

10. The polarizing plate as claimed in claim 9, wherein each of the cellulose based compound and the polystyrene based compound contains fluorine.

11. The polarizing plate as claimed in claim 1, wherein the second retardation layer is a +C layer, and the first retardation layer is a +A layer.

12. The polarizing plate as claimed in claim 1, wherein a slow axis of the first retardation layer is slanted at an angle of −5 to 5° with respect to a light absorption axis of the polarizer.

13. The polarizing plate as claimed in claim 1, wherein the first retardation layer has an in-plane retardation with a short wavelength dispersion (Re(450)/Re(550)) of 1.0 to 1.1.

14. The polarizing plate as claimed in claim 1, wherein the first retardation layer has a degree of biaxiality of 0.9 to 1.1 at a wavelength of 550 nm.

15. The polarizing plate as claimed in claim 1, wherein the first retardation layer is a non-liquid crystal film.

16. The polarizing plate as claimed in claim 15, wherein the first retardation layer comprises a cyclic olefin polymer (COP) based or cyclic olefin polymer copolymer (COC) based film.

17. The polarizing plate as claimed in claim 1, wherein the second retardation layer is directly formed on the first retardation layer.

18. The polarizing plate as claimed in claim 1, wherein the first retardation layer is adhered to the second retardation layer via an adhesive layer.

19. The polarizing plate as claimed in claim 18, wherein a surface of the first retardation layer contacting the adhesive layer has a water contact angle of 60° or less at 25° C., and the adhesive layer has a glass transition temperature of −40° C. or less.

20. An optical display apparatus comprising the polarizing plate as claimed in claim 1.

* * * * *